Dec. 1, 1959　　　　　E. J. DIEBOLD　　　　2,915,685
DRY RECTIFIER ASSEMBLY AND HOUSING THEREFOR
Filed May 27, 1957　　　　　　　　　　2 Sheets-Sheet 1

INVENTOR.
EDWARD J. DIEBOLD
BY P. Gordon Angus
ATTORNEY.

Dec. 1, 1959   E. J. DIEBOLD   2,915,685
DRY RECTIFIER ASSEMBLY AND HOUSING THEREFOR
Filed May 27, 1957   2 Sheets-Sheet 2
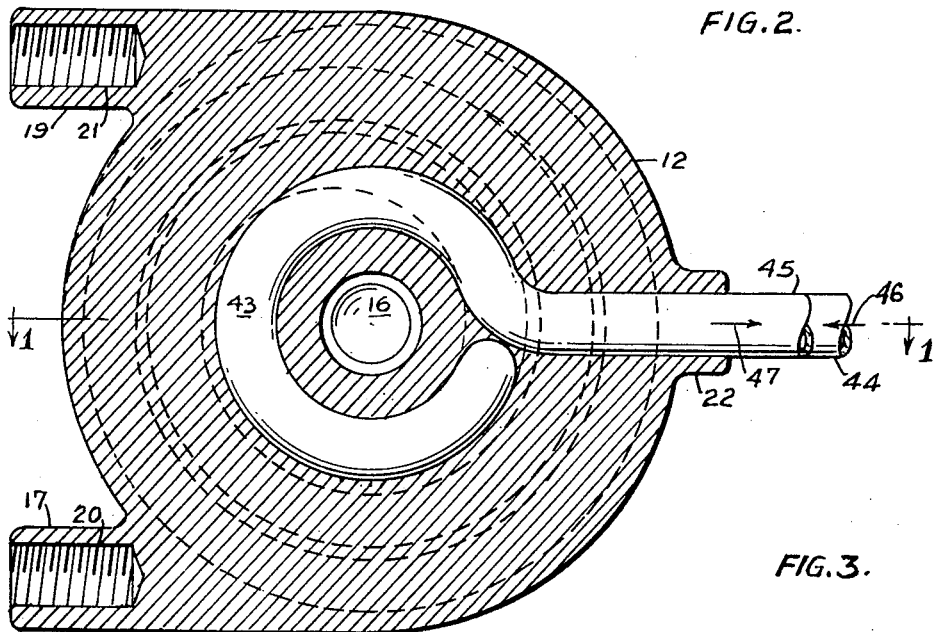
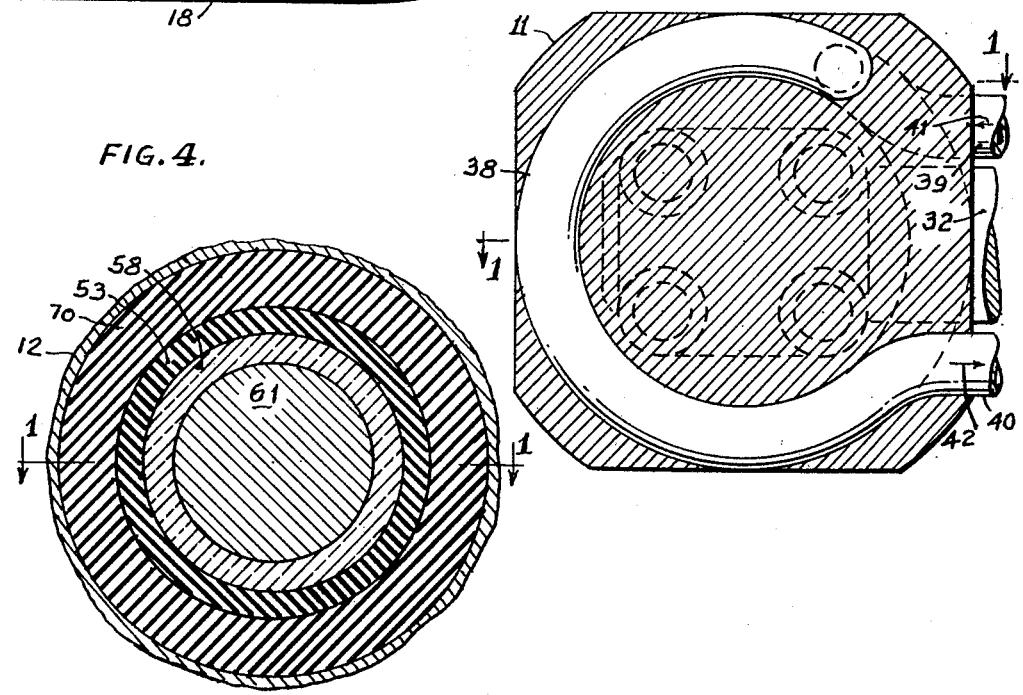
INVENTOR.
EDWARD J. DIEBOLD
BY D. Gordon Angus
ATTORNEY.

United States Patent Office 2,915,685
Patented Dec. 1, 1959

2,915,685

DRY RECTIFIER ASSEMBLY AND HOUSING THEREFOR

Edward J. Diebold, Palos Verdes Estates, Calif., assignor to International Rectifier Corporation, El Segundo, Calif., a corporation of California Application May 27, 1957, Serial No. 661,873

6 Claims. (Cl. 317—234)

This invention relates to dry rectifier assemblies and has for an object to provide an effective assembly for such a rectifier of high current capacity. A related object is to provide an assembly which is effectively cooled.

It has heretofore been a practice to mount such rectifier assemblies in housings, and furthermore the enclosing housings and mounting structures for high-current rectifier assemblies have sometimes been provided with conduits for liquid cooling of the enclosed rectifier assembly.

The present invention is carried out by mounting a high-current dry rectifier assembly in a housing structure capable of taking care of the high-current flow and of dissipating the heat. The rectifier assembly itself comprises an active rectifying material, such as germanium, mounted on a base plate and with an activating material such as indium between said rectifying material and an anode.

A feature of the arrangement resides in the novel means by which this rectifier assembly is assembled.

Another feature of the invention resides in a novel arrangement for mounting the rectifier assembly in the housing.

A related feature resides in the arrangement of liquid-cooling conduits relative to the rectifier assembly, and in the arrangement of the housing structure for holding the rectifier assembly and the cooling conduits.

These and other features will be fully understood from the following detailed description and accompanying drawings of which:

Fig. 2 shows a view taken at line 2—2 in Fig. 1;

Fig. 3 shows a view taken at line 3—3 in Fig. 1; and

Fig. 4 shows a view taken at line 4—4 of Fig. 1.

Figure 1:
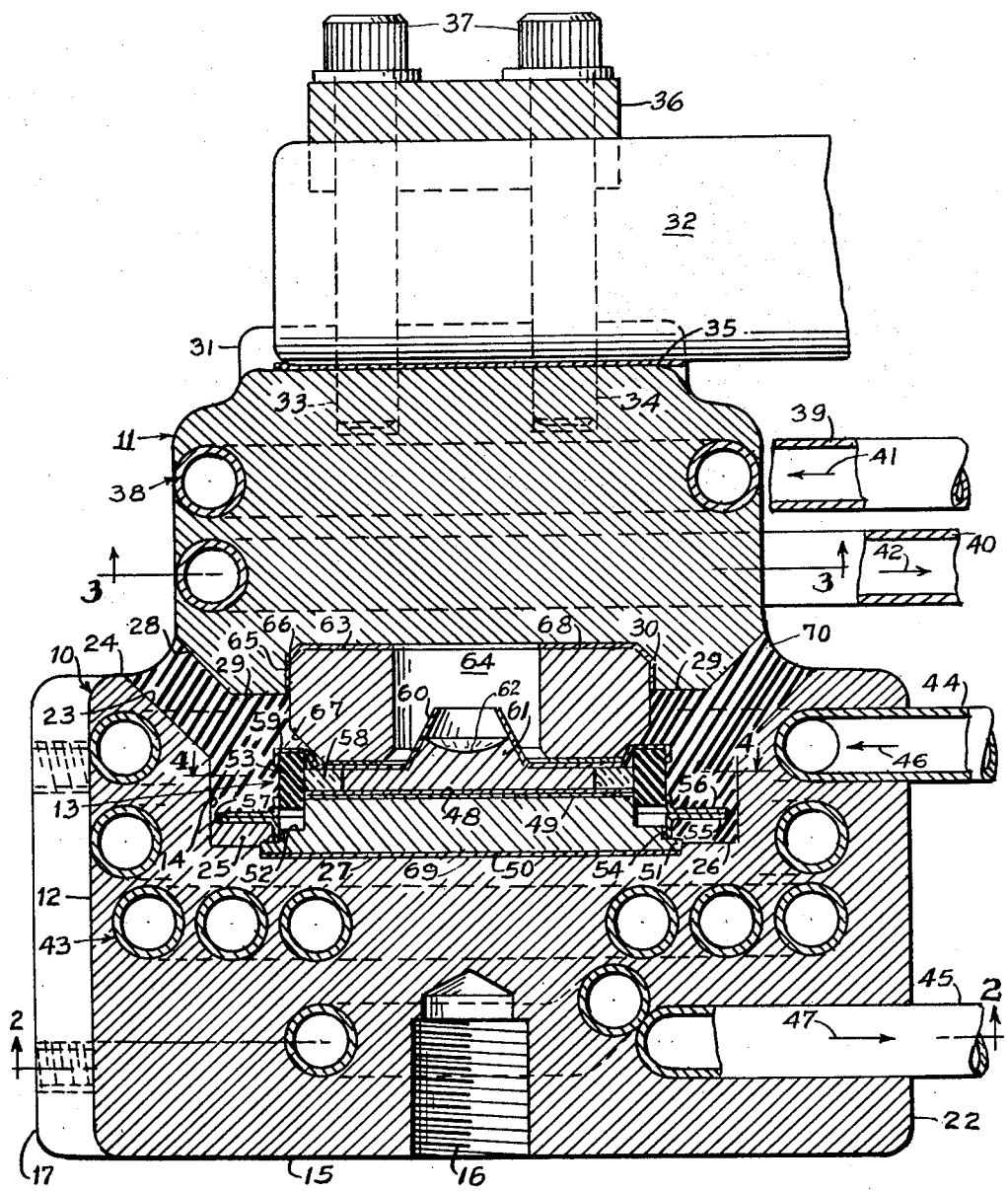
Fig. 1 shows a view in elevation partly in cross section of a high-current rectifier element and enclosing housing structure according to the invention.

Referring to the figures, a housing structure 10 has an upper block 11 and a lower block 12 which are of a material which is a good conductor of heat and electricity, for example copper. The lower block 12 is of sufficient outer diameter to adequately surround a rectifier element structure 13 with a wall 14 of substantial thickness. The lower block 12 extends below the contained rectifier element structure 13 to a flat horizontal bottom 15. A centrally located tapped hole 16 in the bottom 15 is provided for attachment of the lower block 12 to a bus bar or the like, which is not shown here since it is not any part of the invention. The lower block 12 has a protruding ridge 17 which has an outer side 18 tangent to the outer diameter of the lower block 12. Another ridge 19 parallel to the ridge 17 is on the other side of the lower block 12, as best shown in Fig. 2. The ridges 17 and 19 provide legs which are tapped with holes 20 and 21 respectively so that the lower block may be mounted to a supporting structure or the like. A central ridge 22 for a strengthened entry area for conduits 44 and 45 is provided midway between the two tangential ridges 17 and 19 and extending in the opposite direction from them.

The upper internal edge 23 of the wall 14 is disposed at an angle inward so as to provide an inward slanting circular beveled surface from an upper surface 24 to the internal diameter of the wall 14. The wall 14 forms a circular compartment 25 having a circular horizontal bottom 26. A circular horizontal indentation 27 is provided in the center of the compartment bottom 26.

The upper block 11 is preferably of the same material as the lower block 12. The upper block 11 is substantially smaller than the lower block and it has a lower beveled surface 28 which slants inward and downward parallel to the beveled edge 23 of the lower block. A horizontal bottom 29 extends from the bevel surface 28 to a centrally located circular indentation 30 in the bottom of the upper block 11.

The top of the upper block 11 is provided with a curved indented surface 31 into which there is fitted a flexible conductive lead cable 32. Two of four tapped holes are provided on each side of the curved indented surface 31, of which two such holes 33 and 34 are shown in Fig. 1. The cable 32 is soldered at 35 to the curved indented surface 31. A yoke 36 having four holes adapted to receive attachment bolts, such as the bolts 37 which are attached through the yoke 36 into the tapped holes such as 33 and 34, is fitted over the cable 32 to hold the soldered cable in firm conductive contact with the curved indented surface 31.

The upper block 11 is provided with imbedded conduit 38 which is coiled around within the upper block 11 near its periphery. The coiled conduit has an inlet conduit 39 and an outlet conduit 40. Coolant fluid, represented by arrows 41 and 42 in the conduits 39 and 40 respectively, flows into the coil through the conduit 39 and out from the coiled conduit through the conduit 40.

The lower block 12 is also provided with a conduit 43, which is imbedded in the lower block 12 in a coiled arrangement. The conduit 43 has coils which are imbedded in the wall 14 and under the circular indentation 27 provided in the center of the compartment bottom 26. The coiled conduit 43 has an inlet conduit 44 and an outlet conduit 45 entering the lower block 12 on the central protruding ridge 22 at upper and lower elevations of the coiled conduit 43. Arrows 46 and 47, shown in the conduits 44 and 45 respectively represent direction of flow for a coolant fluid provided for the coiled conduit 43. The coiled conduits 38 and 43 in the upper block and lower block respectively are connected to two coolant fluid supply sources which are separated from one another electrically. These fluid supply sources are not here shown, as they are not a part of the present invention.

Between the upper block 11 and the lower block 12 there is provided the dry rectifier assembly 13 comprising a high-current rectifying material 48, preferably in the form of a wafer of germanium, provided for rectifying. The rectifying material 48 in the form of a germanium wafer is prepared by well-known processes which are not here described since it is not a part of this invention. The rectifying material 48 is soldered at 49, with a solder which may be of tin and antimony, preferably in percentages of about 95% and 5% respectively by weight to a base plate 50 which is preferably of copper. The base plate 50 has a circular bottom 51 which fits into the circular indentation 27 in the lower block 12 to keep the base plate in position. A shoulder surface 52 is provided so that an insulation ring 53, preferably of ceramic, can surround the rectifying material 48 in such a way that the outer diameter of the ceramic ring 53 is of the same magnitude and in the same relative position as the outer diameter 54 of the shoulder surface 52 of the base plate 50. Two rings 55 and 56, preferably of nickel-iron, are soldered respectively to the outer wall surface 54 of the shoulder 52 of the base plate and to the ceramic ring 53 which is metalized at the area of contact with the ring 56.

The outer flange edges of the rings 55 and 56 are welded at 57 to hold them together.

A glass ring 58 is provided on top of the germanium wafer 48, and is of the same outer diameter as the wafer. A top plate 59, preferably of nickel-iron, serves as an anode plate clamped over the top of the ceramic ring 53. The top plate 59 is soldered to the ceramic ring 53 which is metalized at areas of contact with the top plate. The top plate 59 is also in contact with the glass ring 58 and lies above the rectifying material 48. The top plate 59 extends upward in a conoidal member 60 over the central portion of the rectifying material 48; said conoidal member having a circular opening at its top.

Between the germanium wafer 48, the glass ring 58 and the top plate 59, there is provided a filling of an activating conductive material 61, preferably indium, in contact with the rectifying material. The upper surface 62 of the indium is below the uppermost limits of the conoidal member 60. Such an activating material functions in a well-known manner in conjunction with the germanium to produce an efficient rectifying action. The effective rectifying action is believed to result from diffusion of the activating material with the germanium which occurs at the interface of these two metals. A conductive anode block 63, preferably of copper, is soldered to the upper surface of the top plate 59. The anode block has a large central hole 64 extending through its center into which the conoidal member 60 extends. The outer surface of the wall 65 of the anode block has chamfered surfaces 66 and 67 at its upper and lower edges respectively.

The rectifier element structure 13 has its anode block 63 soldered at 68 into the circular indentation 30 in the bottom of the upper block 11 and the base plate 50 is soldered at 69 into the circular indentation 27 in the top of the lower block 12.

An electrical insulation resin 70, such as an epoxy resin is used to fill the spaces between the upper block 11, the lower block 12 and the rectifier assembly structure 13. The peripheral configuration of the rectifier assembly 13 enables its various parts to be securely sealed by the resin 70 which surrounds it on all but the uppermost and lowermost horizontal surfaces where it is soldered at 68 and 69, respectively.

To operate the device of this invention, water or other cooling fluid is circulated through the conduits 38 and 43 embedded and coiled within the upper and lower blocks 11 and 12, respectively. Alternating voltage is applied to the rectifier in a well-known manner at the bus bar connection 16 and the flexible lead 32. In the case of large current through the rectifier considerable heat is developed at the rectifying material 48. This heat generated passes through the upper block 11 and the lower block 12 and to the walls of the coiled conduits 38 and 43 contained therein. From the walls of the conduits 38 and 43 the heat is transferred to the coolant passed through the conduits which carries it away to a suitable radiator or the like (not shown) where it is dissipated. The cooling of the blocks 11 and 12 protects the germanium wafer 48 from destructive heat intensity.

Heat is carried away by providing water or other coolant having as low a temperature as is required, in the conduits 38 and 43. The distance from the rectifying material 48 to the various coils of the cooling conduits 38 and 43 is relatively small and the conduits are situated above, below and around the sides of the rectifying material 48. These short distances greatly aid in efficient cooling by maintaining the temperature of the blocks 11 and 12 substantially below that of the area around the rectifying material 48. This also results in effective heat transfer from the area of the wafer 48 through the blocks 11 and 12, due to shorter time required to transfer heat shorter distances and over greater temperature differences.

The large conduit area present because of the number of coils provides adequate heat transfer surface between the blocks 11 and 12 and the conduit walls.

Since heat is effectively transferred at greater temperature differences than smaller temperature differences, over shorter distances than greater distances, and across larger cross-sections of area, than smaller cross-sections of area, the above novel arrangement of the parts of this liquid-cooled housing provides for better cooling than arrangements of liquid-cooled rectifiers previously known.

The balanced design of the liquid-cooled rectifier of this invention provides for transfer of heat from the rectifying material from substantially all sides. The walls of the cooling conduits are thus all kept at a temperature which is greater than that of the contained coolant. This arrangement results in greater total heat transfer when conduits are used which have a small diameter, and have several turns of the coiled conduits, than such arrangement using larger diameter conduits which are not in the form of a coil.

While a germanium rectifying element has been shown herein, it is to be understood that any high-current rectifier element such as silicon, could be used instead. The conduits embedded in the blocks 11 and 12 could be of any good heat conductive material, steel being preferred in this particular embodiment.

The particular rectifier illustrated in the drawing is of the so-called "junction" type. It should be understood, however, that the arrangement of this invention may be applied also to rectifiers other than those ordinarily called the "junction" type; for example, it may be applied to the so-called "dry-plate" type rectifiers. It will be understood that the term "dry rectifier" as used herein covers both the junction-type rectifiers and the dry-plate type rectifiers.

I do not desire that this invention be limited to the specific embodiment shown and described but only as limited by the following appended claims, since persons skilled in the art may devise other forms still within the limitations of said claims.

I claim:

1. A dry rectifier assembly comprising a base plate, rectifying material attached to the base plate, a second plate spaced from the rectifying material at the side of said material opposite the base plate, an insulating member around the periphery of said rectifying material and attached to the base plate and the second plate, a ring around the periphery of said insulating member and attached to the insulating member, a second ring around the periphery of said base plate and attached to the base plate, said second ring and said first ring being attached to one another, and a filling of activating material in the space between the rectifying material and the second plate and within the insulating member.

2. A rectifier assembly according to claim 1 in which said ring around the periphery of said insulating member comprises a flange member, and in which said ring around the periphery of said base plate comprises a flange member, said flange members of said two rings being attached to one another.

3. A rectifier assembly according to claim 1 in which said second plate comprises a peripheral flange disposed over said first insulating member, and attached thereto, a plate member disposed substantially parallel to said rectifying material and in contact with said second insulating member and with said activating material, a conoidal member extending from said plate member is a direction away from said rectifying material, said conoidal member having a hole, said activating material filling the space between said conoidal member and said rectifying material within the insulating member.

4. A dry rectifier assembly comprising a base plate, rectifying material attached to the base plate, a second plate spaced from the rectifying material at the side of said material opposite the base plate, an insulating member around the periphery of said rectifying material and attached to the base plate and the second plate, a second insulating member disposed in the space between said rectifying material and said second plate, said second insulating member being in contact with the first insulating member, the rectifying material and the second plate, said second insulating member having a hole therethrough over a substantial portion of its whole area and a filling of an activating material in space within said hole of the second insulating member and between the rectifying material and the second plate.

5. In combination: an anode block, a dry rectifier assembly comprising a base plate, rectifying material attached to the base plate, a second plate spaced from the rectifying material at the side of said material opposite the base plate, said second plate being in contact with said anode block, an insulating member around the periphery of said rectifying material and attached to the base plate and the second plate, and a filling of an activating material in space between the rectifying material and the second plate within the insulating member, and a rectifier housing for said rectifier assembly, said housing comprising a first electrically conductive block in electrical communication with one side of said rectifying material and attaching to said anode block, a second electrically conductive block spaced from said first electrically conductive block and in electrical communication with the opposite side of said rectifying material and attached to said base plate, and a second electrically insulating material disposed in space between said first and second electrically conductive blocks and forming part of said housing.

6. In combination: an anode block, a dry rectifier assembly comprising a base plate, rectifying material attached to the base plate, a second plate spaced from the rectifying material at the side of said material opposite the base plate, said second plate being in contact with said anode block, an insulating member around the periphery of said rectifying material and attached to the base plate and the second plate, a second insulating member disposed in the space between said rectifying material and said second plate, said second insulating member having a centrally located hole therethrough over a substantial portion of its whole area, and a filling of an activating material in space within said hole of said second insulating member between the rectifying material and the second plate, and a rectifier housing for said rectifier assembly, said housing comprising a first electrically conductive block in electrical communication with one side of said rectifying material and attached to said anode block, a first conduit for the circulation of a coolant fluid, said first conduit having an inlet and an outlet and being in heat-conductive contact with said first electrically conductive block, a second electrically conductive block spaced from said first electrically conductive block and in electrical communication with the opposite side of said rectifying material and attached to said base plate, a second conduit for the circulation of a coolant fluid, said second conduit having an inlet and an outlet and being in heat-conductive contact with said second electrically conductive block, said second conduit being electrically insulated from said first conduit, and an electrically insulating material disposed in space between said first and second electrically conductive blocks and forming part of said housing.

References Cited in the file of this patent

UNITED STATES PATENTS

| | | |
|---|---|---|
| 2,718,615 | Riley | Sept. 20, 1955 |
| 2,751,528 | Burton | June 19, 1956 |
| 2,756,374 | Colleran et al. | July 24, 1956 |
| 2,759,133 | Mueller | Aug. 14, 1956 |
| 2,763,822 | Frola et al. | Sept. 18, 1956 |
| 2,815,472 | Jackson et al. | Dec. 3, 1957 |